United States Patent [19]

Nishino

[11] Patent Number: 5,330,810
[45] Date of Patent: Jul. 19, 1994

[54] LIQUID TRANSFER TUBE

[75] Inventor: Todomu Nishino, Nabari, Japan

[73] Assignee: Nitta Moore Company, Osaka, Japan

[21] Appl. No.: 957,253

[22] Filed: Oct. 6, 1992

[51] Int. Cl.⁵ .............................................. F16L 11/04
[52] U.S. Cl. ................................ 428/36.91; 428/36.6;
428/36.7; 428/36.9; 138/137
[58] Field of Search .................. 428/35.7, 36.6, 36.7,
428/36.9, 36.91, 36.92, 475.8, 476.1, 476.3,
476.9; 138/137; 528/347

[56] References Cited

U.S. PATENT DOCUMENTS 2,987,506  6/1961  Lum ..................................... 528/347
4,758,455  7/1988  Campbell et al. ................ 428/36.91
5,076,329 12/1991  Brunnhofer .......................... 138/137

Primary Examiner—Ellis P. Robinson
Assistant Examiner—Michael A. Williamson
Attorney, Agent, or Firm—Vineet Kohli

[57] ABSTRACT

A fuel transfer tube is capable of being used reliably for transferring alcohol, gasoline, or the mixure thereof. The fuel transfer tube has a polyamide resin layer containing metaxylene group, thickness of which is 0.3mm or less, and a polyolefin resin layer. The tube is formed by simultaneous extrusion method.

11 Claims, 6 Drawing Sheets

LIQUID TRANSFER TUBE

BACKGROUND OF THE INVENTION

1. Field of the Invention

The present invention relates to a tube for transferring alcohol, gasoline or the mixture thereof (hereinafter referred to as a fuel transfer tube).

2. Prior Art

As a tube for transferring alcohol media, for example, as shown in FIG. 6, a tube composed of a polyamide layer 9 and a polyolefin layer 9' disposed inside thereof has been known.

This type of tube is used as a transfer tube such as for transferring media of an automotive brake system (containing alcohol for an antifreeze purpose), and the presence of the polyolefin layer possessing alcohol resistance and impermeability brings about the exellent safety of the brake system as compared with conventional tubes made of polyamide.

However, the tests with the tube on tranferring alcohol and gasoline respectively alone, such as a gasoline permeability test and a moisture permeability test shown below, proved that the gasoline resistance of the tube was not favorable. These test methods and results are shown below.

The tube used in the tests measured 8 mm in outside diameter and 6 mm in inside diameter, and the polyamide layer 9 of the tube was 0.9 mm in thickness and the polyolefin layer 9' thereof was 0.1 mm in thickness.

TEST METHODS

1. Gasoline permeability test

A strip of 200 mm of the tube (outside diameter 8 mm, inside diameter 6 mm) was filled with gasoline, let stand in a 50° C. oven for five days, and the weight loss thereof was measured.

2. Moisture permeability test

A strip of the tube was filled with a moisture adsorbent (molecular sieve), and let stand in a thermostatic oven controlled at 40° C. and 95% RH, and the weight gain of the moisture adsorbent was measured.

3. Flexibility test

The end of a 400 mm-long strip of the tube was held, the load required for winding it 180 degrees around a semicircle of 100 mm in radius was measured.

4. Length change test by alcohol absorption

A strip of 200 mm of the tube was filled with methyl alcohol, let stand for seven days at 20° C., and the length change was measured.

TEST RESULTS

TABLE 1

| Layer composition | | Impermeability | | Alcohol Resistance | Flexibility |
|---|---|---|---|---|---|
| Inside→Outside | | Gasoline | Water | tance | ibility |
| Polyolefin Layer 9' | Polyamide Layer 9 | Δ | ○ | ⊙ | ○ |

The symbols used in Table 1, ⊙, ○, Δ, x denote as follows in Table 2.

TABLE 2

| Judgement | Gasoline permeability | Moisture permeability | Alcohol Resistance | Flexibility |
|---|---|---|---|---|
| ⊙ | 10 mg or less | 9 mg/m/day or less | 0 mm | 500 g or less |
| ○ | 10~50 mg | 10~29 | 3 mm or less | 500~800 g |
| Δ | 100 mg or more | 30~99 | 4~7 mm | 800 g or more |
| x | — | 100 or more | 8 mm or more | — |

From Tables 1 and 2, the tube used in the test was found to be preferable in alcohol resistance, but not in gasoline impermeability.

SUMMARY OF THE INVENTION

It is hence a primary object of the present invention to provide a flexible fuel transfer tube which can be used reliably for transferring alcohol, gasoline or the mixture thereof.

A fuel transfer tube of the present invention comprises a polyamide resin layer containing metaxylene group, the layer being 0.3 mm or less in thickness, and a polyolefin resin layer, the tube being formed by simultaneous extrusion forming method.

In this composition, the present invention brings about the following actions.

Although the polyamide resin layer containing metaxylene group is 0.3 mm or less in thickness, the permeation of gasoline may be controlled to a very small level as compared with a polyamide resin layer. Besides, the alcohol resistance is maintained high by the polyolefin resin layer.

Moreover, since the polyamide resin layer containing metaxylene group is 0.3 mm or less in thickness, the flexibility which is essential to this type of tube is also ensured.

DETAILED DESCRIPTION OF THE INVENTION

Figure 1:
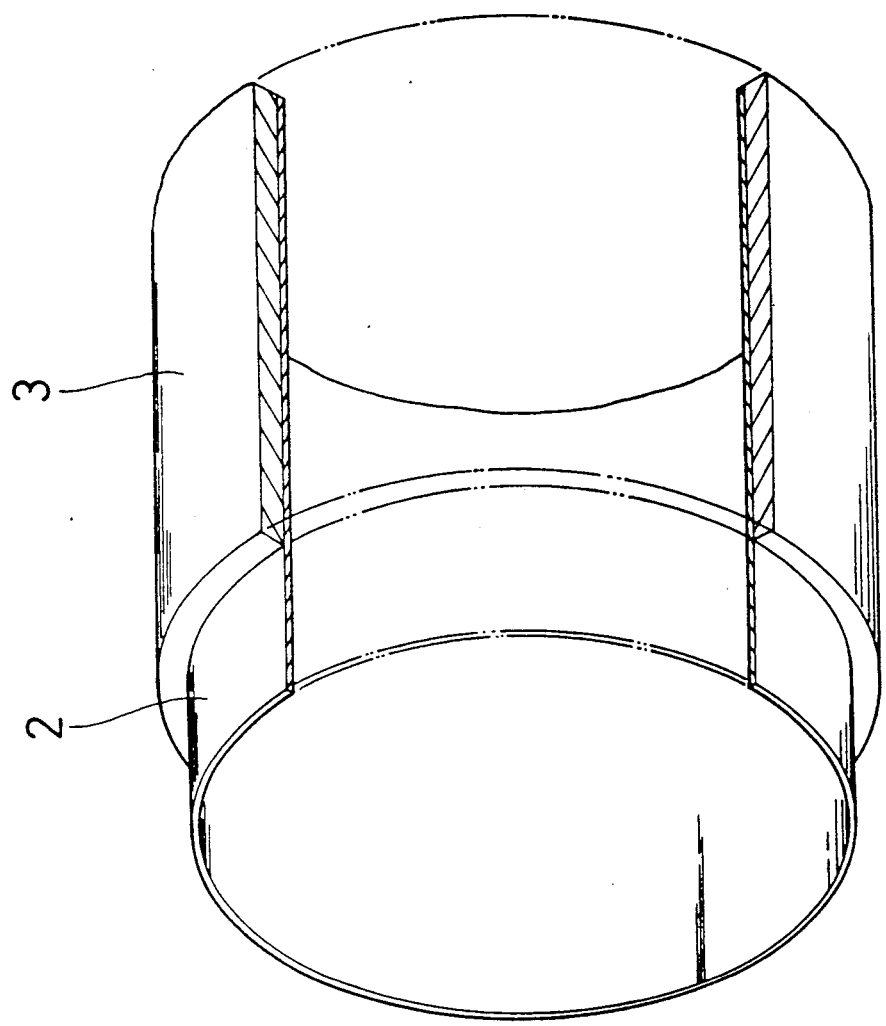
FIG. 1 is a sectional perspective view of a fuel transfer tube in a first embodiment of the present invention.

Referring now to the drawings, some of embodiments of the present invention are described in detail below.

EMBODIMENT 1

This embodiment is composed of two layers as shown in FIG. 1. The layers are formed by laminating a polyamide resin layer containing metaxylene group 2 (hereinafter referred to as MX nylon layer 2) in the inside and a polyolefin resin layer 3 (hereinafter referred to as PO layer 3) in the outside. The MX nylon layer 2 and the PO layer 3 are respectively 0.2 mm and 0.8 mm in thickness, and thus laminated tube is as a whole 8 mm in outside diameter and 6 mm in inside diameter.

EMBODIMENT 2

Figure 2:
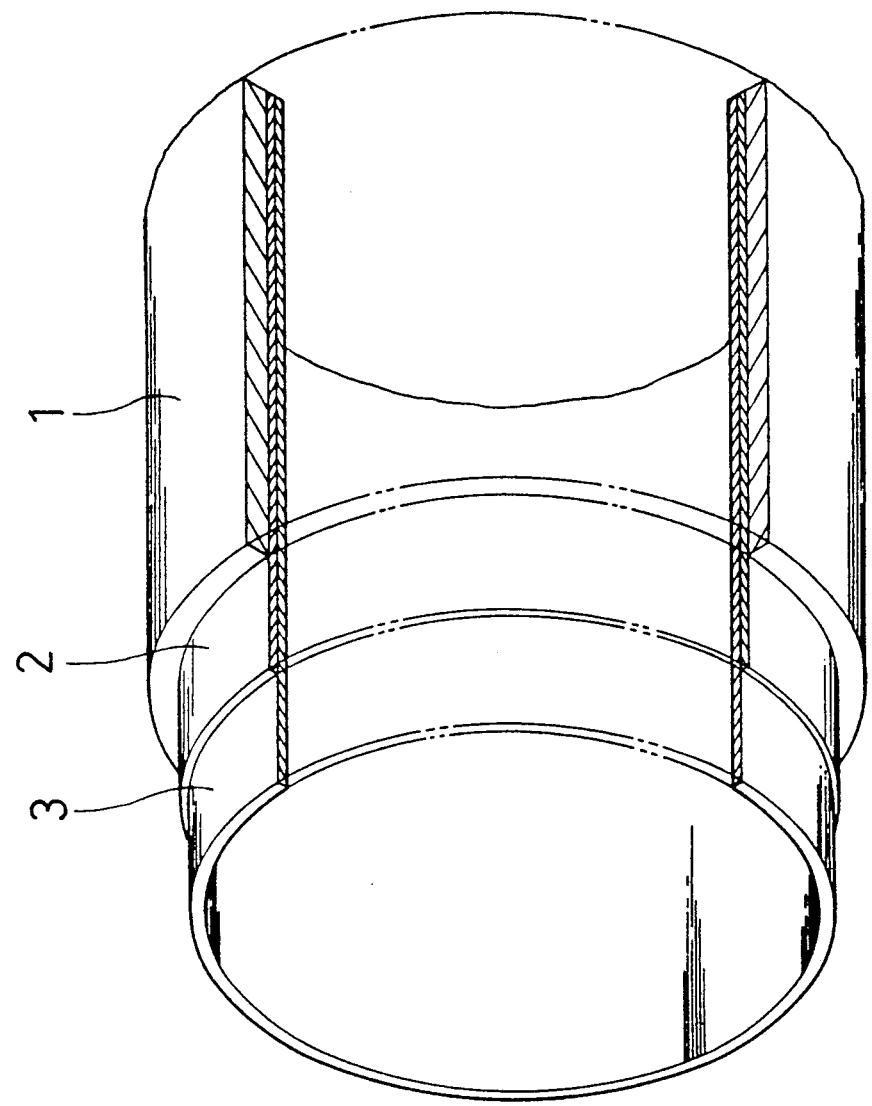
FIG. 2 is a sectional perspective view of a fuel transfer tube in a second embodiment of the invention.

This embodiment is composed of three layers as shown in FIG. 2. The composition is formed by laminating a PO layer 3, an MX nylon layer 2, and a polyamide resin layer 1 (hereinafter referred to as nylon 12 layer 1) in sequence from inside to outside. The PO layer 3, the nylon layer 2 and the nylon 12 layer 1 are respectively 0.1 mm, 0.1 mm, and 0.8 mm in thickness, and thus laminated tube is as a whole 8 mm in outside diameter and 6 mm in inside diameter, same as the foregoing embodiment.

EMBODIMENT 3

Figure 3:
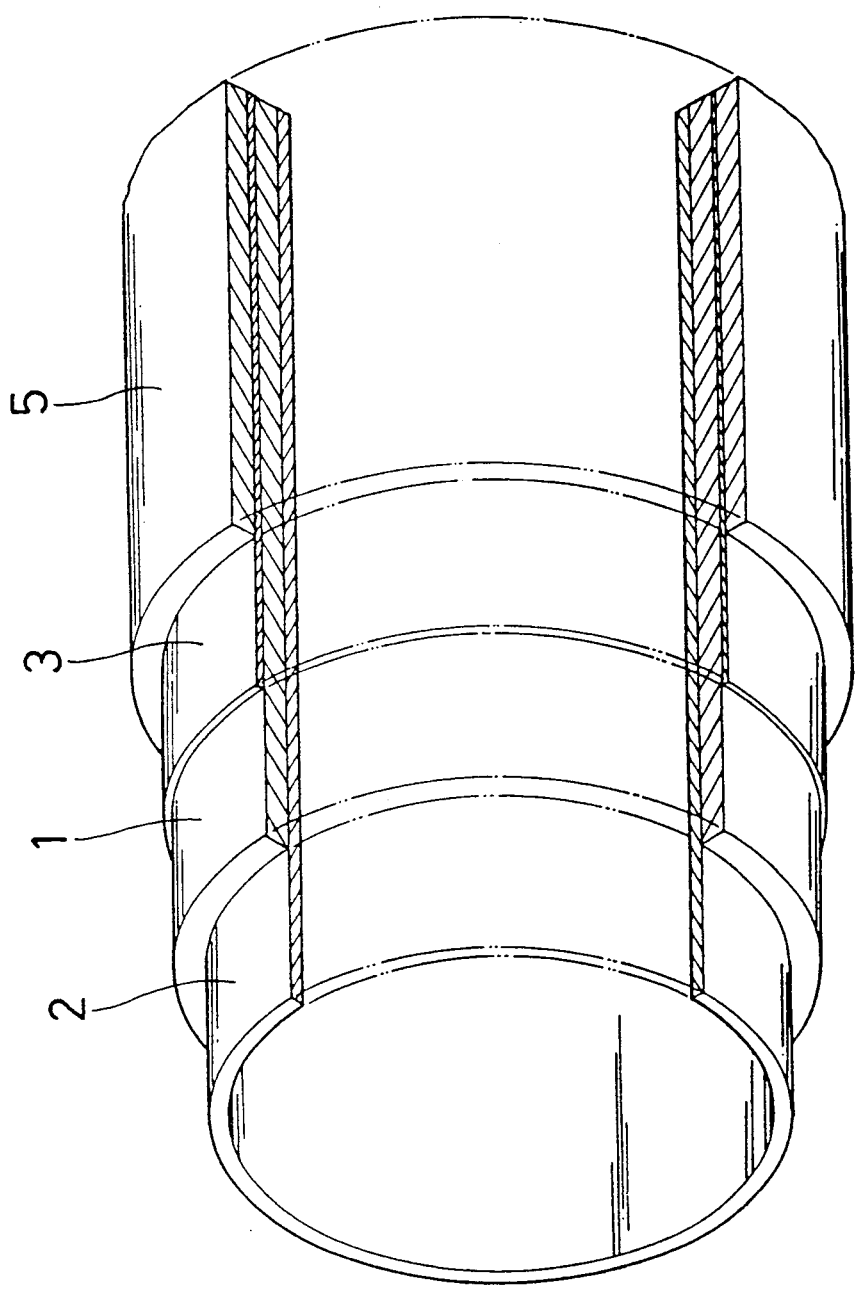
FIG. 3 is a sectional perspective view of a fuel transfer tube in a third embodiment of the invention.

This embodiment is composed of four layers as shown in FIG. 3. The composition is formed by laminating an MX nylon layer 2, a nylon 12 layer 1, a PO layer 3, and a superhigh molecular polyethylene layer 5 in sequence from inside to outside. The thicknesses of respective layers are 0.1 mm, 0.35 mm, 0.05 mm, and 0.5 mm, and thus laminated tube is as a whole 8 mm in outside diameter and 6 mm in inside diameter.

EMBODIMENT 4

Figure 4:
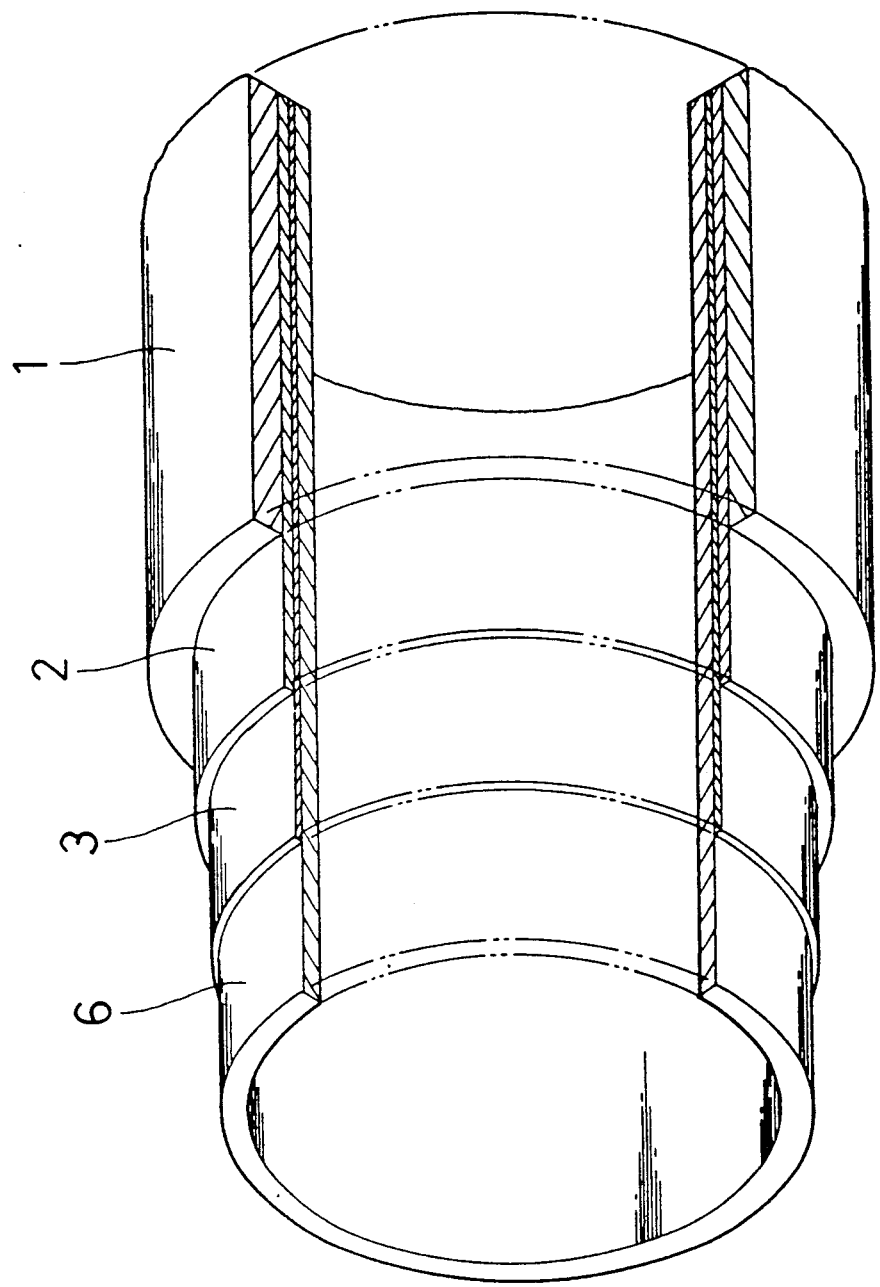
FIG. 4 is a sectional perspective view of a fuel transfer tube in a fourth embodiment of the invention.

This embodiment is composed of four layers as shown in FIG. 4. The composition is formed by laminating a nylon 6 layer containing elastomer 6, a PO layer 3, an MX nylon layer 2, and a nylon 12 layer 1 in sequence from inside to outside. The thicknesses of the respective layers are 0.35 mm, 0.05 mm, 0.1 mm, and 0.5 mm, and thus laminated tube is as a whole 8 mm in outside diameter and 6 mm inside diameter.

EMBODIMENT 5

Figure 5:
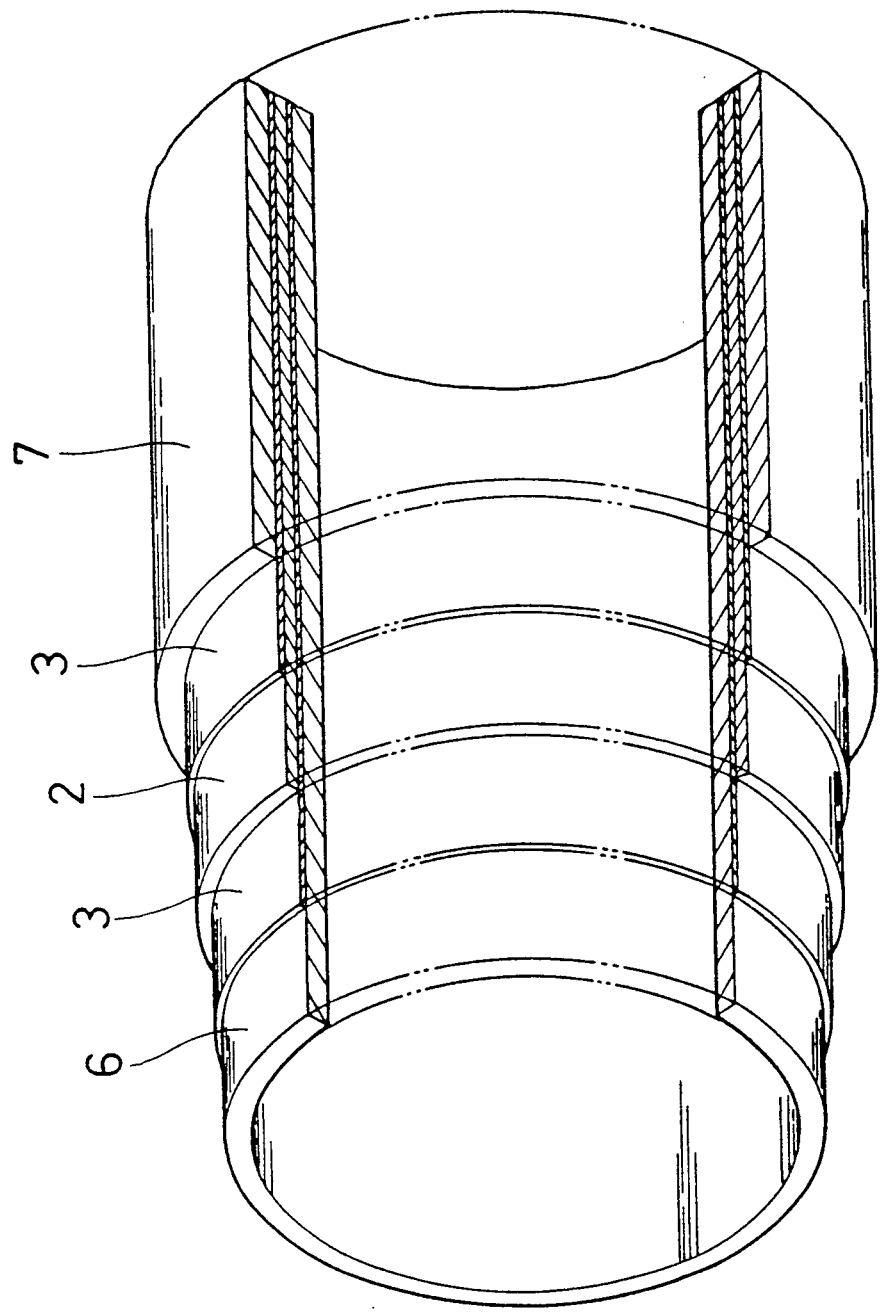
FIG. 5 is a sectional perspective view of a fuel transfer tube in a fifth embodiment of the invention.
Figure 6:
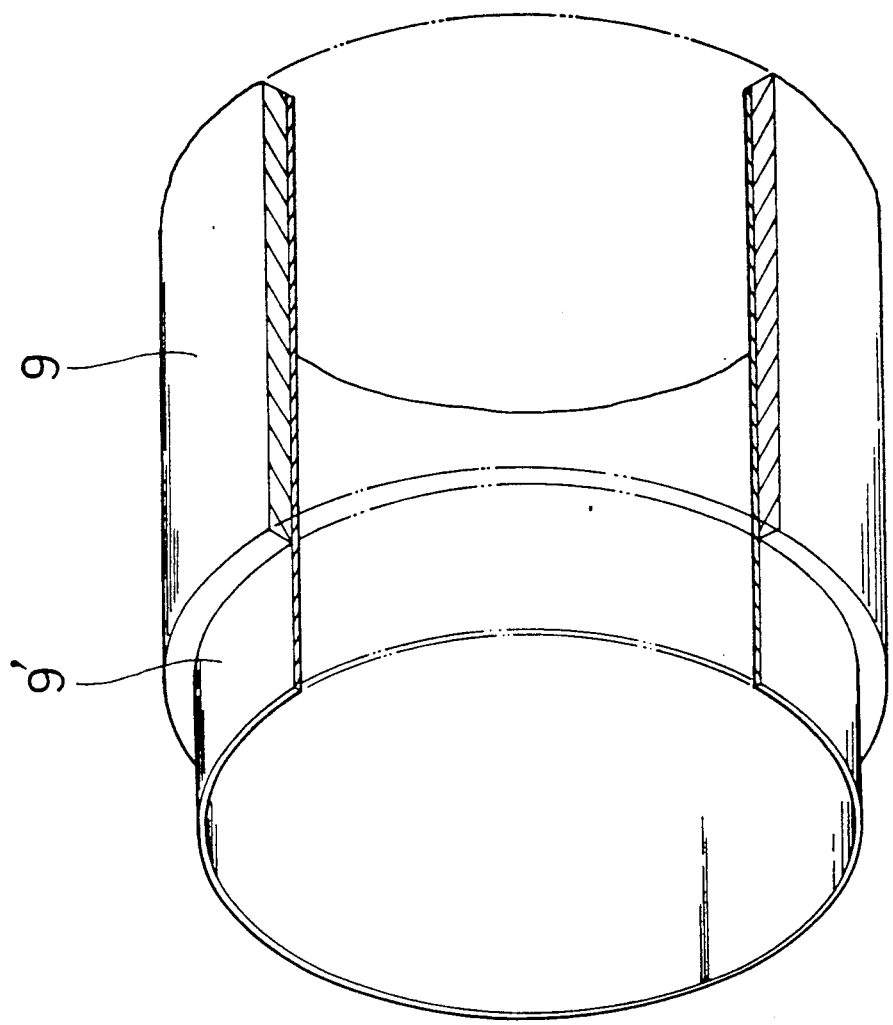
FIG. 6 is a sectional perspective view of a conventional tube.

This embodiment is composed of five layers as shown in FIG. 5. The composition is formed by laminating a nylon 6 layer containing elastomer 6, a PO layer 3, an MX nylon layer 2, a PO layer 3, and a nylon 12 layer containing elastomer 7 in sequence from inside to outside. The thicknesses of the respective layers are 0.35 mm, 0.05 mm, 0.1 mm, 0.05 mm and 0.45 mm, and thus laminated tube is as a whole 8 mm in outside dismeter and 6 mm in inside diameter.

Any known common extrusion forming, extrusion coating and other methods may be arbitrarily employed as a forming method of the fuel transfer tubes in Embodiments 1 to 5. Particularly the method with common extrusion forming using two, three or four extruders and a tube die for multiple layers may produce endless tubes efficiently.

Each resin may be formed in any desired shape in a temperature range not lower than the softening point and not higher than the decomposition point, but generally the range between about 150° and 320° C. is chosen, and in particular that of 190° to 280° C. is preferable.

The principal resins mentioned above are defined below, and the results tested in the same methods as mentioned above in the prior art are given in Table 3.

Definitions of Principal Resins

Polyamide resin containing metaxylene group

In the present invention, the polyamide resin containing metaxylene group is a polymer containing at least 70 mol % in the molecular chain of the constituent units composed of metaxylene diamine, or mixed xylene diamine containing metaxylene diamine and paraxylene diamine (not more than 30% thereof), and α, ω-aliphatic dicarboxylic acid with 4 to 10 carbon atoms.

Such polymers include, for example, homopolymers such as polymetaxylene adipamide, polymetaxylene sebacamide, and polymetaxylene seperamide, copolymers such as metaxylene/paraxylene adipamide copolymer, metaxylene/paraxylene pimeramide copolymer, and metaxylene/paraxylene azelamide copolymer, and further copolymers having the components of these homopolymers or copolymers copolymerized with aliphatic diamine such as hexamethylene diamine, alicyclic diamine such as piperazine, aromatic diamine such as para-bis-(2-aminoethyl) benzene, aromatic dicarboxylic acid such as terephthalic acid, lactams such as ε-caprolactam, ω-aminocarboxylic acid such as γ-aminoheptanic acid, and aromatic aminocarboxylic acid such as para-aminomethyl benzoic acid. The content of the paraxylene diamine mentioned above is not more than 30% of the total xylene diamine, and the content of the constituent units composed of xylene diamine and aliphatic dicarboxylic acid is at least 70 mol % or more in the molecular chain.

The polyamide resin containing metaxylene group itself is, by nature, brittle in an amorphous state, and the relative viscosity is generally required to be 1.5 or more, or preferably 2.0 to 4.0.

These polymers may be combined with homopolymers or copolymers, for example, nylon 4.6, nylon 6, nylon 6.6, nylon 6.10, nylon 6.12, nylon 11, nylon 12, and nylon 12.12.

To enhance the flexibility, the polyamide resin containing metaxylene group may be blended with soft rubber materials, such as styrene, butadiene rubber, chloroprene rubber, butyl rubber, nitrile rubber, ethylene propylene rubber, acrylic rubber, urethane rubber, ethylene chlorosulfonate chloroprene rubber, and fluororubber, or thermoplastic elastomers, such as polyester elastomer, polyamide elastomer, olefin elastomer, vinyl chloride elastomer, urethane elastomer, and styrene elastomer. The content of the blended materials is 0 to 97 wt. %, or preferably 20 to 85 wt. %. A relatively soft thermoplastic resin with the elastic modulus of 12,000 kg/cm$^2$ or less may be also blended therein.

Various additives may be blended as required in a range not spoiling the present invention. Examples of additives include coloring matter, ultraviolet absorbent, antistatic agent, antioxidant, lubricant, nucleic agent, plasticizer, flame retardant, shock resisting agent, and inorganic filler.

Polyamide resin

The polyamide resin in the present invention includes a linear polyamide of high molecular content. This type of polyamide may be homopolyamide, copolyamide, or the blend thereof.

Such a polyamide may include homopolyamide, copolyamide, or the blend thereof having an amide repeating unit of

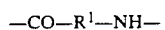
$$-CO-R^1-NH- \qquad (1)$$

or

$$-CO-R^2-CONH-R^3-NH \qquad (2)$$

($R^1$, $R^2$, and $R^3$ denote straight-chain alkylene groups). Considering the gas barrier property against oxygen or carbon dioxide, the number of amide groups per 100 carbon atoms in the polyamide resin used in the invention is desired to be 3 to 30, and especially homopolyamide, copolyamide or the blend thereof in a range of 4 to 25 is preferable. Practical examples of suitable homopolyamide include polycapramide (nylon 6), poly-ω-aminohepetanic acid (nylon 7), poly-ω-aminononanic acid (nylon 9), polyundecanamide (nylon 11), polylaurynlactam (nylon 12), polyethylene diamine azipamide (nylon 2.6), polytetramethylene azipamide (nylon 4.6), polyhexamethylene azipamide (nylon 6.6), polyhexamethylene sebacamide (nylon 6.10), polyhexamethylene dodecamide (nylon 6.12), polyoctamethylene azipamide (nylon 8.6), polydecamethylene azipamide (nylon 10.6), polydecamethylene sebacamide (nylon 10.10), and polydedecamethylene dodecamide (nylon 12.12). Proper copolyamide to be used in the present invention include, for example, caprolactam/laurynlactam copolymer, caprolactam/hexamethylene diammonium azipate copolymer, laurynlactam/hexamethylene diammonium azipate copolymer, hexamethylene diammonium azipate/hexamethylene diammonuim sepacate copolymer, etylene diammonium azipate/hexamethylene diammonium azipate copolymer, and caprolactam/hexamethylene diammonium azipate/hexamethylene diammonium sepacate copolymer.

To endow these polyamide with flexibility, plasticizers such as aromatic sulfonamide, P-hydroxy benzoic acid and esters, elastomer components of low elasticity, and lactams may be blended therein.

Elastomer components may be selected from ionomer resin, denatured polyolefin resin, polyether amide resin, polyester amide resin, polyether ester amide resin, polyether ester resin, denatured styrene thermoplastic elastomer, denatured acrylic rubber, denatured ethylene propylene rubber, and others compatible with polyamide resin with the elastic modulus of 3,000 kgf/cm² or less, which may be used either alone or in combination.

Polyolefin resin

The polyolefin resin used in the present invention is generally a hydrocarbon resin. The following are examples thereof:

Olefin polymers such as polyethylene, polybutadiene, polyisoprene, polyisobutylene, polybutylene, polymethylpentene, polypropylene, polyterpen resin, polybutene and ethylene-butadiene copolymer;

α-olefin copolymers obtained by copolymerizing two or three or more kinds of ethylene, propylene, 1-butene, 1-hexene, 4-methyl-pentene, 1-decen, 1-hexadecen and 1-icocen;

acid denatured olefin polymer or aicd denatured α-olefin copolymer graft copolymerized with unsaturated monocarboxylic acid such as acrylic acid, methacrylic acid and α-methylacrylic acid, unsaturated dicarboxylic acid such as maleic acid, fumaric acid, itaconic acid, citraconic acid, tetrahydrophthalic acid, methyl tetrahydrophthalic acid, nadic acid and methyl nadic acid, or derivatives of the above unsaturated mono- or dicarboxylic acid such as acid halide, amide, imide, anhydride and ester, and;

copolymers of these acid denatured α-olefin copolymer with diene components.

Out of the above-listed polyolefin resins, either one member alone or a mixture of two or more members may be used.

Not limitative particularly to thermoplastic resins, however, crosslinked polyethylene and other crosslinked polyolefin resins may be also employed. One of proper examples is water crosslinked polyolefin, which is a polyolefin obtained by copolymerizing or grafting a compound containing a silyl group possessing a hydrolyzable organic group, including a polyolefin capable of crosslinking by the action of water in the presence of silanol condensation catalyst.

TEST RESULT

TABLE 3

| Embodiments | Layer composition (Inside→Outside) | | | | | A | | B | C |
|---|---|---|---|---|---|---|---|---|---|
| | ① | ② | ③ | ④ | ⑤ | (x) | (y) | | |
| 1 | MX nylon layer | PO layer | | | | ⊙ | ⊙ | ⊙ | ⊙ |
| 2 | PO layer | MX nylon layer | Nylon 12 layer | | | ⊙ | ⊙ | ⊙ | ⊙ |
| 3 | MX nylon layer | Nylon 12 layer | PO layer | Superhigh molecular polyethylene layer | | ⊙ | ⊙ | ⊙ | ⊙ |
| 4 | Nylon 6 layer containing elastomer | PO layer | MX nylon layer | Nylon 12 layer | | ⊙ | ⊙ | ⊙ | ⊙ |
| 5 | Nylon 6 layer containing elastomer | PO layer | MX nylon layer | PO layer | Nylon 12 layer containing elastomer | ⊙ | ⊙ | ⊙ | ⊙ |

(Note)
A . . . Impermeability
B . . . Alcohol resistance
C . . . Flexibility
(x) . . . Gasoline
(y) . . . Water The symbol ⊙ used in Table 3 denotes same as in Table 2.

Being thus composed, the present invention brings about the following effect.

The present invention, as clearly shown in Table 3, provides flexible fuel transfer tubes capable of being used reliably for transferring alcohol, gasoline, or the mixture thereof.

What is claimed is:

1. A flexible, alcohol resistant, gasoline resistant fuel transfer tube having controlled gasoline permeation formed by simultaneous extrusion, comprising:
   at least a first layer and a second layer;
   said first layer having a polyamide resin containing at least 70 mol % in the molecular chain of the constituent units composed of metaxylene diamine or mixed xylene diamine containing metaxylene diamine and paraxylene diamine wherein said paraxylene diamine content is not more than 30% thereof, and an α,ω-aliphatic dicarboxylic acid having 4 to 10 carbon atoms;
   said polyamide has a relative viscosity of at least 1.5;
   said first layer being no more than 0.3 mm in thickness; and
   said second layer having a polyolefin resin.

2. A fuel transfer tube according to claim 1, wherein said polyolefin resin is an acid-denatured olefin resin.

3. A fuel transfer according to claim 1, further comprising a polyamide resin layer on a side of said first layer opposite said second layer.

4. A flexible, alcohol resistant, gasoline resistant fuel transfer tube having controlled gasoline permeation formed by simultaneous extrusion, comprising:
   a polyolefin resin layer;
   a polyamide resin layer on a first side of said polyolefin resin layer;
   said polyamide resin layer containing at least 70 mol % in the molecular chain of the constituent units composed of metaxylene diamine or mixed xylene diamine containing metaxylene diamine and paraxylene diamine wherein said paraxylene diamine content is not more than 30% thereof, and an $\alpha,\omega$-aliphatic dicarboxylic acid having 4 to 10 carbon atoms;
   said polyamide resin layer being no more than 0.3 mm in thickness; said polyamide having a relative viscosity of at least 1.5;
   a nylon layer on a second side of said polyolefin resin layer; and said nylon layer containing an elastomer.

5. A fuel transfer tube according to claim 4, further comprising a second nylon layer on a side of said polyamide resin layer opposite a location of said first polyolefin resin layer.

6. A fuel transfer tube according to claim 4, further comprising:
   a second polyolefin resin layer on a side of said polyamide resin layer opposite a location of said first polyolefin resin layer; and
   a second nylon layer on a side of said second polyolefin resin layer opposite a location of said polyamide resin layer.

7. A flexible, alcohol resistant, gasoline resistant fuel transfer tube having controlled gasoline permeation formed by simultaneous extrusion, comprising:
   a polyolefin resin layer;
   a nylon layer on a first side of said polyolefin resin layer;
   a polyamide resin layer on a second side of said nylon layer; said polyamide having a relative viscosity of at least 1.5;
   said polyamide resin layer containing at least 70 mol % in the molecular chain of the constituent units composed of metaxylene diamine or mixed xylene diamine containing metaxylene diamine and paraxylene diamine wherein said paraxylene diamine content is not more than 30% thereof, and an $\alpha,\omega$-aliphatic dicarboxylic acid having 4 to 10 carbon atoms;
   said polyamide resin layer being no more than 0.3 mm in thickness; and a polyethylene layer on a second side of said polyolefin resin layer.

8. A fuel transfer tube of claim 1, wherein said relative viscosity is from 2.0 to 4.0.

9. A fuel transfer tube of claim 1, wherein said first layer further comprises:
   a blend of said polyamide resin and 0 to 97 weight % of at least one of soft rubber materials or thermoplastic elastomer.

10. A fuel transfer tube of claim 9, wherein said soft rubber material includes at least one of styrene, butadiene, chloroprene rubber, butyl rubber, urethane rubber, ethylene propylene rubber, acrylic rubber, ethylene chlorosulfonate chloroprene rubber or flourorubber.

11. A fuel transfer tube of claim 9, wherein said thermoplastic elastomer includes at least one of polyester elastomer, polyamide elastomer, olefin elastomer, vinyl chloride elastomer, urethane elastomer or styrene elastomer.

* * * * *